(12) United States Patent
More et al.

(10) Patent No.: US 8,764,021 B2
(45) Date of Patent: Jul. 1, 2014

(54) SEAL ASSEMBLY

(75) Inventors: Dominick G. More, Middletown, CT (US); Leonard D. Stern, Southington, CT (US); Robert Wharton, Marlborough, CT (US); Gordon D. Rowe, Southington, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 1579 days.

(21) Appl. No.: 11/741,811

(22) Filed: Apr. 30, 2007

(65) Prior Publication Data

US 2008/0029966 A1 Feb. 7, 2008

Related U.S. Application Data

(63) Continuation of application No. PCT/US2006/023451, filed on Jun. 14, 2006.

(60) Provisional application No. 60/690,426, filed on Jun. 14, 2005.

(51) Int. Cl.

| F16L 21/05 | (2006.01) |
|---|---|
| H02G 15/04 | (2006.01) |
| F16L 17/073 | (2006.01) |
| F16L 17/03 | (2006.01) |
| F16L 21/02 | (2006.01) |
| H02G 15/013 | (2006.01) |
| F16L 17/00 | (2006.01) |
| F16L 33/16 | (2006.01) |

(52) U.S. Cl.
USPC ........... 277/603; 277/612; 277/615; 285/108; 285/112

(58) Field of Classification Search
USPC ......... 277/603, 612, 615, 616, 619, 624, 647; 285/110–112, 108
See application file for complete search history.

(56) References Cited

U.S. PATENT DOCUMENTS

| 1,926,107 A | 9/1933 | Morehead |
| 2,211,983 A | 8/1940 | Parris |

(Continued)

FOREIGN PATENT DOCUMENTS

| EP | 0688992 | 12/1995 |
| EP | 0867647 | 9/1998 |

(Continued)

OTHER PUBLICATIONS

PCT/US2006/023451; PCT International Search Report dated Oct. 27, 2006.

*Primary Examiner* — Vishal Patel
*Assistant Examiner* — Nicholas L Foster
(74) *Attorney, Agent, or Firm* — Renner, Otto, Boisselle & Sklar, LLP

(57) ABSTRACT

A seal assembly (10) comprising a sealing body (40), a shoe (42), a first collar (44), and a second collar (46). The shoe (42) is positioned within a space defined by radially inner surfaces of the sealing body (40), the first collar (44) is positioned on a first axial side of the sealing body (40), and the second collar (46) is positioned on a second axial side of the sealing body (40). These components (40, 42, 44, 46) collectively form inter-component sealing surfaces, pocket sealing surfaces, gate sealing surfaces and/or part sealing surfaces which prevent the infiltration of outside fluid into, and the escape of operative fluid from, a fluid coupling.

12 Claims, 3 Drawing Sheets

(56) References Cited

U.S. PATENT DOCUMENTS

| | | | |
|---|---|---|---|
| 2,422,009 A | 6/1947 | Goetze | |
| 3,033,582 A | 5/1962 | Creavey | |
| 3,039,794 A * | 6/1962 | De Cenzo | 137/614.03 |
| 3,047,301 A * | 7/1962 | Taylor et al. | 277/612 |
| 3,083,023 A | 3/1963 | Creavey | |
| 3,158,380 A * | 11/1964 | Carrell et al. | 277/611 |
| 3,204,971 A * | 9/1965 | Meriano | 277/641 |
| 3,291,506 A * | 12/1966 | Blakeley | 285/112 |
| 3,339,948 A | 9/1967 | Weitzel | |
| 3,479,063 A | 11/1969 | Raver | |
| 3,512,789 A * | 5/1970 | Tanner | 277/647 |
| 3,531,133 A | 9/1970 | Sheesley et al. | |
| 3,680,894 A * | 8/1972 | Young | 285/112 |
| 3,820,830 A | 6/1974 | Dryer | |
| 3,836,159 A | 9/1974 | Dryer | |
| 3,888,496 A | 6/1975 | Dryer | |
| 3,915,462 A * | 10/1975 | Bruns et al. | 277/647 |
| 3,930,656 A | 1/1976 | Jelinek | |
| 4,218,080 A | 8/1980 | Kendrick | |
| 4,289,164 A * | 9/1981 | Ekman | 137/614.03 |
| 4,406,467 A | 9/1983 | Burger et al. | |
| 4,477,087 A | 10/1984 | Sutter, Jr. et al. | |
| 4,690,438 A | 9/1987 | Kanczarek | |
| 4,717,179 A * | 1/1988 | Haberstock et al. | 285/112 |
| 4,747,606 A * | 5/1988 | Jennings | 277/612 |
| 4,776,600 A | 10/1988 | Kohn | |
| 4,822,077 A * | 4/1989 | Hendrickson | 285/12 |
| 4,848,806 A | 7/1989 | Miller | |
| 4,896,697 A * | 1/1990 | Stromdahl | 137/614.03 |
| 4,930,791 A * | 6/1990 | Ungchusri et al. | 277/607 |
| 5,110,144 A * | 5/1992 | Burton et al. | 277/328 |
| 5,165,703 A * | 11/1992 | Morvant | 277/342 |
| 5,203,594 A * | 4/1993 | Straub | 285/112 |
| 5,246,236 A * | 9/1993 | Szarka et al. | 277/337 |
| 5,249,829 A * | 10/1993 | Hendrickson | 285/112 |
| 5,280,969 A * | 1/1994 | Straub | 285/105 |
| 5,482,082 A | 1/1996 | Turner et al. | |
| 5,518,257 A * | 5/1996 | Breaker | 277/612 |
| 5,799,954 A * | 9/1998 | Layer | 277/614 |
| 6,007,106 A * | 12/1999 | Wilkins | 285/110 |
| 6,070,914 A * | 6/2000 | Schmidt | 285/112 |
| 6,170,883 B1 * | 1/2001 | Mattsson et al. | 285/110 |
| 6,290,231 B1 * | 9/2001 | Petrash et al. | 277/324 |
| 6,394,140 B1 * | 5/2002 | Peacock et al. | 138/112 |
| 6,419,237 B1 | 7/2002 | More | |
| 6,581,940 B2 * | 6/2003 | Dittel | 277/606 |
| 6,648,001 B2 * | 11/2003 | Chatufale | 137/15.18 |
| 6,942,222 B2 * | 9/2005 | Fink | 277/608 |
| 7,032,905 B2 * | 4/2006 | Mullally | 277/647 |
| 7,090,224 B2 * | 8/2006 | Iguchi et al. | 277/603 |
| 7,128,323 B2 * | 10/2006 | Iguchi et al. | 277/644 |
| 2005/0258641 A1 * | 11/2005 | Gibb | 285/112 |
| 2006/0061047 A1 * | 3/2006 | Mullally | 277/647 |

FOREIGN PATENT DOCUMENTS

| | | |
|---|---|---|
| EP | 0930452 | 7/1999 |
| GB | 926789 | 5/1963 |
| WO | 0011379 | 3/2000 |

* cited by examiner

SEAL ASSEMBLY

RELATED APPLICATIONS

This application is a continuation under 35 U.S.C. §120 of International Patent Application No. PCT/US2006/023451 filed on Jun. 14, 2006 which claims priority to U.S. Provisional Patent Application No. 60/690,426 filed on Jun. 14, 2005. The entire disclosures of these applications are hereby incorporated by reference.

GENERAL FIELD

This invention relates generally to a seal assembly and, more particularly, to a seal assembly for forming a seal between interfacing surfaces of a first part and a second part.

BACKGROUND

In an undersea oil well, hydraulic fluid is used to send "pressure pulses" to control various equipment during the drilling operation. Typically, the actuating fluid is delivered from a floating rig through a chain of fluid supply conduits which are connected by a series of underwater fluid couplings. An underwater fluid coupling can comprise a male part and a female part which are coupled/uncoupled from each other by relative linear movement therebetween.

The male part of a fluid coupling, such as an underwater fluid coupling, can comprise one or more passages and the female part can comprise a corresponding number of passages. In an uncoupled condition, a slide gate closes the passages in the male part and another slide gate closes the passages in the female part. When coupling the parts together, the slide gate closing the passages in the male part is linearly pushed (e.g., slid) by the female part in one direction and the slide gate closing the passages in the female part is linear pushed (e.g., slid) by the male part in the opposite direction. In the coupled condition, the gates are positioned so that male and female passages are open and they connect to form a fluid passageway. A seal assembly is commonly provided to seal the interface between the male part and the female part when the fluid coupling is in the coupled condition.

SUMMARY

The present invention provides a seal assembly which can be used, for example, in an undersea coupling arrangement, a quick-connect and/or quick-disconnect coupling arrangement, and any other compatible coupling arrangement between two parts. The seal assembly has a simple fabrication (as few as four components) making it economical to produce and/or easy to install. At the same time, the seal assembly can be constructed to have a relatively long life. For example, it can be built to withstand in excess of 10,000 cycles of pressure pulses at 15,000 psi. By way of comparison, commercial and/or conventional seal assemblies often comprises nine separate components and sometimes cannot withstand more than 2,000 cycles of pressure pulses at 15,000 psi.

DRAWINGS

DETAILED DESCRIPTION

Figure 1A:
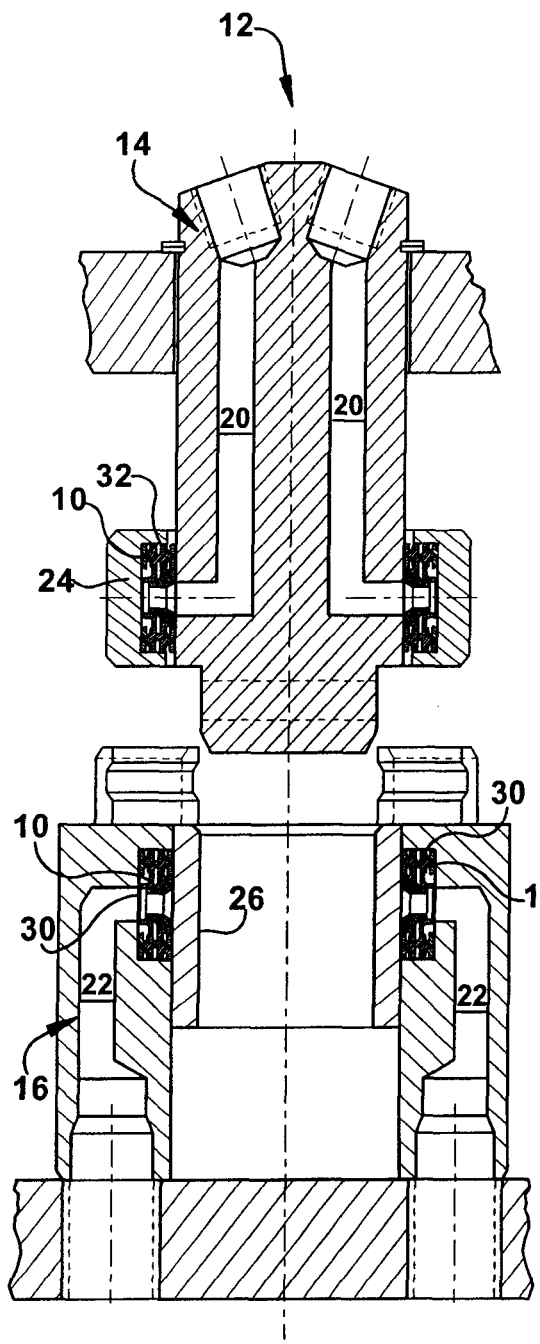
FIGS. 1A and 1B are sectional views of a fluid coupling having a seal assembly that seals the interface between the male part and female part, the coupling being shown in an uncoupled condition in FIG. 1A and in a coupled condition in FIG. 1B.
Figure 1B:
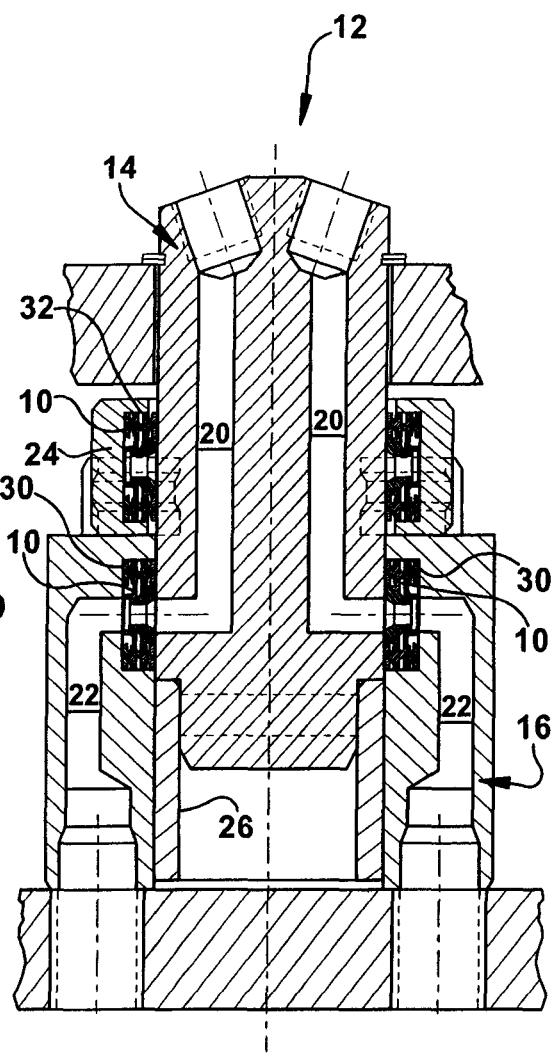

Referring now to the drawings, and initially to FIGS. 1A and 1B, a seal assembly 10 is shown in conjunction with a fluid coupling 12. The fluid coupling 12 comprises a male part 14 and a female part 16 that can be coupled to and uncoupled from each other by relative linear movement therebetween. In FIG. 1A, the fluid coupling 12 is shown in an uncoupled condition, and in FIG. 1B, the fluid coupling 12 is shown in a coupled condition. The fluid coupling 12 can be used, for example, in an undersea oil well to convey hydraulic fluid that is used to send "pressure pulses" to control various equipment during the drilling operation. That being said, the seal assembly 10 can be used in a multitude of fluid coupling situations and, in fact, may be used in any suitable situation wherein sealing of the interface between a first part and a second part is desired.

The male part 14 can comprise one or more fluid passages 20 and the female part 16 can comprise a corresponding number of passages 22. In the uncoupled condition (FIG. 1A), a slide gate 24 closes the passages 20 in the male part 14 and another slide gate 26 closes the passages 22 in the female part 16. When coupling the parts 14 and 16 together, the gate 24 traverses the female part 16 in one direction and the gate 26 traverses the male part 14 in the opposite direction to open and connect the passages 20 and 22. In the coupled condition (FIG. 1B), the passages 20 and 22 are open and aligned with each other to form a fluid passageway from the male part 14 to the female part 16. Locking means (not specifically shown and/or numbered) can be provided to hold the parts 14 and 16 in the coupled condition and/or release means (also not specifically shown or numbered) can be provided to allow the parts 14 and 16 to be selectively uncoupled by linear movement therebetween.

Figure 2:
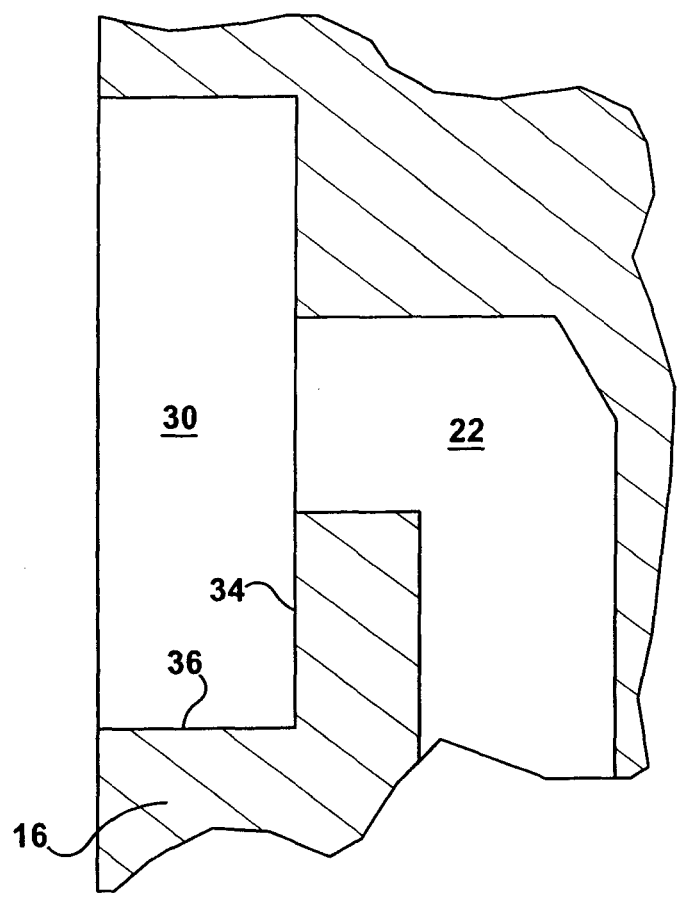
FIG. 2 is a close-up view of a seal-receiving pocket in the female part.

The female part 16 includes a circular pocket 30 surrounding the inlet/outlet of each of its fluid passages 22 and the seal assembly 10 is seated within this pocket 30. As is best seen by referring briefly to FIG. 2, the pocket 30 includes an end wall 34 (e.g., a floor) and a side wall 36. The floor 34 has a central opening forming the inlet/outlet of the fluid passage 22 in the female part 16. The distal edge of the side wall 36 (i.e., the edge remote from the floor 34) defines the access opening through which the seal assembly 10 is inserted into the pocket 30. Referring back to FIGS. 1A and 1B, the slide gate 24 (which closes the fluid passages 20 in the male part 14 when the coupling 12 is in its uncoupled condition) can include a similar pocket 32 and a seal assembly 10 seated therein.

Figure 3:
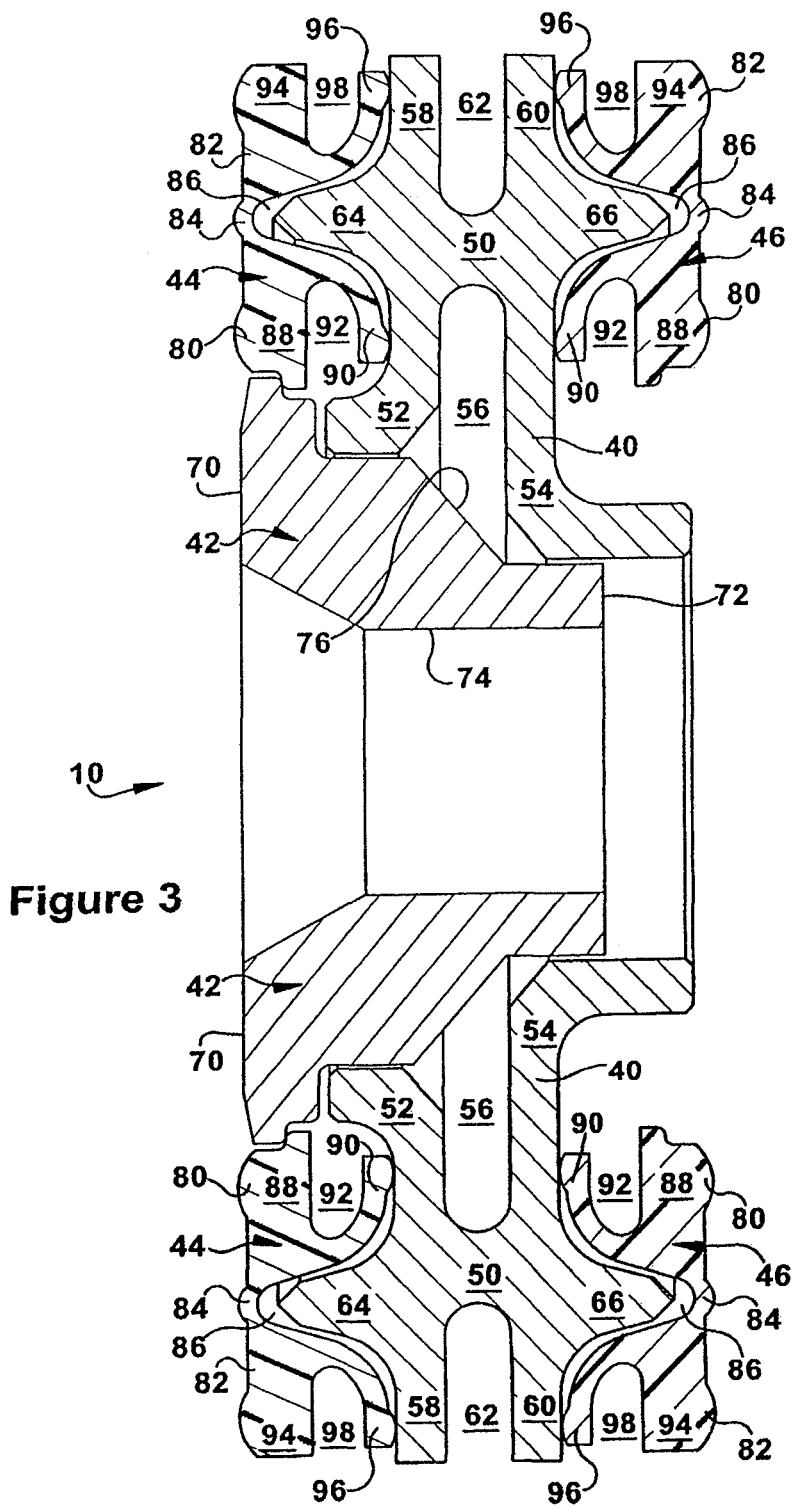
FIG. 3 is a close-up sectional view of the seal assembly.

Referring now to FIG. 3, the seal assembly 10 is shown in detail. The seal assembly 10 generally comprises a main sealing body 40, a shoe 42, a first sealing collar 44, and a second sealing collar 46. The illustrated seal assembly 10 has four components thereby making it economical to produce and/or easy to install. That being said, a seal assembly with additional components is certainly possible and contemplated. Moreover, in certain applications one or more components (e.g., the shoe 42) may not be necessary and thus could be omitted from the seal assembly 10.

When viewed relative to its longitudinal axis, the seal assembly 10 has a first axial side, a second axial side, a radially inner side, and a radially outer side. In the illustrated orientation, the longitudinal axis is a horizontal line, the first axial side is the left-hand side, and the second axial side is the right-hand side. When the seal assembly 10 is seated within the pocket 30, its first axial side engages the slide gate 26 when the fluid coupling 12 is in the uncoupled condition and engages the male part 14 when the fluid coupling 12 is in its coupled condition. The second axial side of the seal assembly 10 engages the floor 34 of the pocket 30. The radially inner surface forms a fluid passageway, and the radially outer side of the seal assembly 10 engages the side wall 36 of the pocket 30.

The main sealing body 40 comprises an annular base portion 50, a first leg portion 52, and a second leg portion 54. The leg portions 52 and 54 extend radially inward from the annular base portion 50 and are separated by a slot 56. The first leg portion 52 is positioned nearest to the first axial side of the seal assembly 10 and the second leg portion 54 is positioned nearest to the second axial side of the seal assembly 10. The second leg portion 54 extends radially inward to a further extent than the first leg portion 52. For example, the extension of the second leg portion 54 can be 10%, 20%, 30%, and/or 40% or more than the extension of the first leg portion 52.

The sealing body 40 additionally comprises a first arm portion 58 and a second arm portion 60 which extend radially outward from the annular base 50 and which are separated by a slot 62. The radial extension of the arm portions 58 and 60 can be the same and they can be less than, greater than, or substantially the same as the radial extension of the leg portions 52 and 54. In the illustrated embodiment, the first arm portion 58 is radially aligned with the first leg portion 52, the second arm portion 60 is radially aligned with the second leg portion 54, and the slot 62 is radially aligned with the slot 56.

The sealing body 40 further comprises a first ridge portion 64 which projects axially outward from the annular base 50 in a first direction (towards the first axial side of the seal assembly 10) and a second ridge portion 66 which projects axially outward from the annular base portion 50 in a second direction (towards the second axial side of the seal assembly 10). The ridge portions 64 and 66 may be axially aligned with each other but radially offset relative to the annular base 50, the slot 56, and/or the slot 62.

The sealing body 40 can be made of any suitable material that provides sufficient sealing and adequate endurance in the intended environment. For an undersea coupling, the sealing body 40 can be made of metal that can handle the required design pressures and fracture toughness. The metal can be, for example, stainless steel or a nickel super-alloy, and may be coated with a more malleable material such as gold, silver of copper. The sealing body 40 may be machined, cast, injection molded, or may be made by a combination of these fabrication techniques. If the sealing body 40 is formed in one-piece, as illustrated, no weld joints are necessary thereby eliminating this often time-consuming manufacturing step along with the corresponding weld-inspection step.

With particular reference to machining, and especially the machining of the inner slot 56, the leg design of the sealing body 40 allows a one-piece fabrication. As was noted above, the first leg portion 52 does not extend as far radially inward as the second leg portion 54. The wide opening afforded by the first leg portion 52 allows a cutting tool access to the inner diameter of the sealing body 40 for removal of material to form the slot 56. With a symmetrical leg design, access by a cutting tool that would create the desired slot depth is usually not possible.

The shoe 42 is a generally cylindrical component having a first axial surface 70, a second axial surface 72, a radially inner surface 74, and a radially outer surface 76. The first axial surface 70 can be relatively flat, with its circumferential edge slanted to provide a ramp-like rim to facilitate the sliding of the male part 14 or slide gate 26 thereby. The second axial surface 72 can also be relatively flat.

The inner surface 74 can include a radially flared section adjacent the first axial surface 70 and a narrower section extending therefrom to the second axial surface 72. When the seal assembly 10 is installed in the pocket 30, and the fluid coupling 12 is in its coupled condition, the radially inner surface 74 forms a flow path between the aligned fluid passage 20 in the male part 14 and the corresponding fluid passage 22 in the female part 16. The flared section of the radially inner surface 74 may increase the passage-alignment tolerance and/or may improve flow characteristics.

The radially outer surface 76 interfaces with the sealing body 40 and the first collar 44. To this end, the surface 76 can have stepped sections, constant-diameter sections, and/or tapering sections corresponding to the shape of these components. With particular reference to any metal-to-polymer engagements (e.g., shoe-to-collar engagements), the interfacing sections of the shoe 42 are shaped and sized to minimize gaps therebetween to avoid cold flow and/or extrusion of polymer at high pressures and/or elevated temperatures.

The shoe 42 may be made of any suitable material that can provide sufficient compression strength and can survive expected wear and friction. Suitable materials can include many types of metal (e.g., a copper based alloy) and could even be a plastic (e.g., a hard plastic) in certain situations. The piece can be coated with an anti-wear coating, if appropriate for a particular application. The shoe 42 can be machined, powder formed, or injection molded, and preferably formed in one-piece, although multi-piece shoes are certainly possible and contemplated.

The first collar 44 comprises an inboard portion 80, an outboard portion 82, and a bridge portion 84 therebetween. The purpose of the inboard portion 80 is to prevent escape of the operative fluid (e.g., the hydraulic fluid) from its intended flow path and the purpose of the outboard portion 72 is to prevent infiltration of an outside fluid (e.g., seawater) into this flow path. The primary purpose of the bridge portion 84 is to be an isthmus between the inboard portion 80 and the outboard portion 82 for ease in assembly and/or installation. The portions 80 and 82 define a crevice 86 axially adjacent the bridge portion 84 in which the first ridge portion 64 of the sealing body 40 is received. In some cases, the bridge portion 84 may break during operation of the seal assembly 10 and, if so, the sealing capability of the assembly 10 is not compromised.

The inboard portion 80 comprises an axially outer lip 88, an axially inward lip 90 and a slot 92 therebetween. The outboard portion 82 comprises an axially outer lip 94, an axially inward lip 96, and a slot 98 therebetween. The outer lips 88 and 94 can be constructed to be thicker than the inner lips 90 and 96, as illustrated, as these are the components which contact the traversing components in the fluid coupling 12. This additional bulk in the seal lips 88 and 94 can help reduce the possibility of material deviation, shearing or other deformation/damage.

The second collar 46 has corresponding portions (80, 82, 84), lips (88, 90, 94, 96), and slots (92, 98). In the illustrated embodiment, the collar 44 and the collar 46 are identical and positioned symmetrically relative to the sealing body 40. In this manner, only three separate subassemblies need to be fabricated to mass-manufacture seal assemblies 40, with the number of collars 44/46 required being twice that of the seal bodies 40 and the shoes 42 for each production run.

A seal assembly 40 wherein the collar 44 and the collar 46 have different constructions is certainly possible and contemplated. If this approach is adopted, the shoe-interfacing geometry of the collar 44 (e.g., the stepped profile on the axially outer and radially inner edge of the inboard lip 88) can be eliminated. Additionally or alternatively, the inboard lips 88 and 90 in the collar 46 may be able to radially extend a greater distance to follow the longer reach of the second leg portion 54 in the sealing body 40. Also, the additional bulk in the axially outer lips 88 and 94 may not be necessary as they will not be interfacing with any traversing surfaces.

The collar 44 and the collar 46 can be made of a polymer which is compatible with the intended use of the seal assembly 10. Suitable qualities could include a low coefficient of friction, high tensile strength, and/or reasonable resistance to corrosion. The material can be a plastic, a thermoplastic, and/or a thermosetting plastic polymer such as, for example, polyvinylchloride (PVC), polyurethane, polytetrafluoroethylene (PTFE), polyether-ether ketone (PEEK), and modifications thereof.

The collar 44 and the collar 46 can be injection molded and/or machined from the selected material. If the collar 44 and the collar 46 are identical components, as illustrated, only one injection mold is necessary, and/or the same machining operation can be used, for the production of both of these components. An embodiment wherein the collar 44 and/or the collar 46 is/are molded onto the sealing body 40 and/or the shoe 42 may be possible with some seal designs and thus is contemplated. If an increase in assembly components is not a significant concern, the inboard portion 80 and the outboard portion 82 can be separately fabricated thereby eliminating the need for the bridge portion 84.

The interfacing surfaces of the collar 44 and the collar 46 are shaped and sized to minimize gaps between them and the sealing body 40 and/or the shoe 42. Specifically, for example, the ridge-adjacent surfaces of the axially inner lips 90 and 96, are contoured to follow the profile of the ridge portions 64 and 66. The shoe-adjacent surface of the inboard lip 90 in the collar 46 may be stepped for mating with the stepped section of the radially outer surface 76 of the shoe 42.

When the seal 10 is assembled and installed in the fluid coupling 12, the collar 46 is situated on the floor 34 of the pocket 30. The sealing body 40 is positioned over the collar 46, with its second ridge portion 66 projecting into the bridge-adjacent crevice 86 in the collar 46. The collar 44 is positioned over the sealing body 40 with its bridge-adjacent crevice 86 receiving the first ridge portion 64. The shoe 42 resides in the space formed by the radially inner surfaces of the sealing body 40 and the collar 44.

When the sealing body 40 is installed in the pocket 30, its leg portions 52 and 54 deflect and its annular base portion 50 bends in response to this deflection. The distal surface of the second leg portion 54 abuts against the floor 34 of the pocket 30 thereby forming an anchor against which to compress the sealing body 40. The shoe 42 maintains its shape during deflection and its first axial surface 70 is substantially flush with the axial sealing surfaces of the collar 44.

The deflection of the leg portions 52 and 54 seats the sealing surfaces of the collars 44 and 46 against their interfacing surfaces. Specifically, the outer axial surfaces of the inboard portion 80 and the outboard portion 82 of the collar 44 seal against the adjacent surface of the slide gate 26 when the fluid coupling 12 is in a uncoupled condition and the adjacent surface of the male part 14 when the fluid coupling 12 is in its coupled condition. Likewise, the outer axial surfaces of collar 46 seal against the floor 34 of the pocket 30. The leg-adjacent surfaces of the lips 90 in the inboard portions 80 of the first and second collars 44 and 46 seal against the collar-adjacent surfaces of the first and second leg portions 52 and 54, respectively. The arm-adjacent surfaces of the lips 96 in the outboard portions 82 likewise seal against the arm portions 58 and 60. The ridge portions 64 and 66 in the seal body 40 function as reinforcement to guard against over-compression and/or deformation of the thin axially inner lips 90 and 96.

During operation, the seal assembly 10 is further energized by pressurized fluid within the slots 56 and 62 of the sealing body 40, and the slots 92 and/or 98 in the collars 44 and 46. This pressurization urges the slot-defining surfaces away from each other thereby increasing the sealing loads on the interfacing surfaces of the leg portions 52 and 54, the arm portions 58 and 60, and the lips 88, 90, 94 and 96. It may be noted that if the seal assembly 10 is used in the pocket 32 of the slide gate 24, fluid from the aligned passage 20 of the male part 14 can provide this internal pressurization.

One may now appreciate that the seal assembly 10 has a simple fabrication making it economical to produce and/or easy to install. Despite this simplicity, the seal assembly 10 does not have to apologize for any sacrifice in sealing capabilities and/or life expectancies when compared to conventional seal designs. In fact, the assembly 10 will often provide superior sealing and a significantly longer life span than conventional seals.

Although the seal assembly 10 has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one or more of several illustrated embodiments, such feature may be combined with one or more other features of the other embodiments, as may be desired and advantageous for any given or particular application.

The invention claimed is:

1. A seal assembly for sealing an interface between a male part and a female part that can be coupled to and uncoupled from each other by relative linear movement therebetween;

said seal assembly comprising a main seal body including an annular base portion, a first leg extending radially inward from the base portion, a second leg extending radially inward from the base portion, and a slot between the first leg and the second leg;

wherein the first leg and the second leg are deflectable towards each other;

wherein the first leg extends radially inward from the base portion for an overall distance less than an overall distance by which the second leg extends radially inward from the base portion;

wherein the base portion, the first leg, and the second leg are formed in a uniform one piece;

wherein the main sealing body also comprises a first arm portion extending radially outward from the base portion, a second arm portion extending radially outward from the base portion, and a slot therebetween; and wherein the arm portions are formed in one piece with the base portion.

2. A seal assembly as set forth in claim 1, further comprising a first sealing collar positioned on a first axial side of the main sealing body, wherein the first sealing collar includes a bridge portion connecting an inboard portion and an outboard portion, and wherein the inboard portion, the outboard portion, and the bridge portion are formed in one-piece.

3. A seal assembly as set forth in claim 2, wherein the main sealing body comprises a ridge portion extending axially outward from its base portion, wherein the ridge portion is formed in one piece with the base portion, and wherein the first sealing collar includes a crevice into which this ridge portion is received.

4. A seal assembly as set forth in claim 2, further comprising a second sealing collar positioned on a second axial side of the main sealing body, wherein the second sealing collar includes a bridge portion connecting an inboard portion and an outboard portion, and wherein the inboard portion, the outboard portion, and the bridge portion are formed in one-piece.

5. A seal assembly as set forth in claim 4, wherein the first sealing collar and the second sealing collar have identical constructions.

6. A seal assembly as set forth in claim 4, wherein the main sealing body comprises a ridge portion extending axially outward from its base portion and wherein the second sealing collar includes a ridge-receiving crevice positioned radially between its inboard portion and the outboard portion.

7. A seal assembly as set forth in claim 1, further comprising a shoe positioned within radially inner surfaces of the main sealing body, wherein the shoe maintains its shape during deflection of the legs.

8. A fluid coupling comprising a male part, a female part, and the seal assembly set forth in claim 1;
   wherein the male part and the female part linearly move relative to each other to convert between an uncoupled condition and a coupled condition; and
   wherein the seal assembly is positioned in a pocket in the female part and contacts the male part in the coupled condition.

9. A seal assembly comprising a sealing body and a shoe;
   wherein the sealing body includes an annular base portion, a first leg extending radially inward from the base portion, a second leg extending radially inward from the base portion, and a slot between the first leg and the second leg;
   wherein the shoe has a radial inner surface with a radially flared conical section that is thicker adjacent a first axial surface, and a narrower section extending from the flared conical section to a second axial surface, and is positioned within radially inner surfaces of the sealing body;
   wherein the shoe maintains its shape during deflection of the legs; and
   further comprising a first sealing collar positioned on a first axial side of the sealing body and positioned radially outward from the first axial surface of the shoe and a second sealing collar positioned on the second axial side of the sealing body and positioned radially outward from the second axial surface of the shoe.

10. A fluid coupling comprising a first part, a second part, and the seal assembly set forth in claim 9;
    wherein the first part and the second part move relative to each other to convert between an uncoupled condition and a coupled condition; and
    wherein the seal assembly is positioned in a pocket in the second part and contacts the first part in the coupled condition.

11. A seal assembly comprising:
    a one-piece sealing body having deflecting legs;
    a one-piece shoe positioned within radially inner surfaces of the sealing body, wherein the shoe has a radial inner surface with a radially flared conical section that is thicker adjacent a first axial surface, and a narrower section extending from the flared conical section to a second axial surface;
    a first one-piece collar on a first axial surface of the sealing body; and
    a second one-piece collar on a second axial surface of the sealing body; and
    wherein the first one-piece sealing collar is positioned on a first axial side of the sealing body and positioned radially outward from the first axial surface of the shoe and the second one-piece sealing collar is positioned on the second axial side of the sealing body and positioned radially outward from the second axial surface of the shoe.

12. A fluid coupling comprising a first part, a second part, and the seal assembly set forth in claim 11;
    wherein the first part and the second part move relative to each other to convert between an uncoupled condition and a coupled condition; and
    wherein the seal assembly is positioned in a pocket in the second part and contacts the first part in the coupled condition.

* * * * *